United States Patent [19]

Flynn

[11] Patent Number: 5,642,479
[45] Date of Patent: Jun. 24, 1997

[54] TRACE ANALYSIS OF DATA PROCESSING

[75] Inventor: David Walter Flynn, Cambridge, United Kingdom

[73] Assignee: Advanced Risc Machines Limited, Cambridge, United Kingdom

[21] Appl. No.: 368,837

[22] Filed: Jan. 5, 1995

[30] Foreign Application Priority Data

Sep. 20, 1994 [GB] United Kingdom ............ 9418900

[51] Int. Cl.$^6$ .................................................. G06F 11/34
[52] U.S. Cl. ................................................. 395/183.21
[58] Field of Search ........................ 371/6, 22.1, 22.5, 371/22.6, 27, 28; 27/28; 364/DIG. 1 MS File, DIG. 2 MS File; 395/376, 180, 183.01, 183.06, 183.03, 183.07, 183.13, 183.21, 183.1

[56] References Cited

U.S. PATENT DOCUMENTS

| | | | |
|---|---|---|---|
| 4,503,495 | 3/1985 | Boudreau | 364/200 |
| 4,511,960 | 4/1985 | Boudreau | 364/200 |
| 5,289,587 | 2/1994 | Razban | 395/376 |
| 5,488,688 | 1/1996 | Gonzales et al. | 395/183.1 |

FOREIGN PATENT DOCUMENTS

2 214 334  8/1989  United Kingdom ............ G06F 13/36

*Primary Examiner*—Robert B. Harrell
*Attorney, Agent, or Firm*—Albert C. Smith

[57] ABSTRACT

A data processing system is described in which trace signals are provided upon a trace bus 12 to track the address of an instruction code currently being executed and the latest address to which a data access was made. The system incorporates a central processing unit core 14 and an instruction pipeline 16 via which instruction codes are fed to the central processing unit core 14. When a non-sequential instruction code fetch is made, a number of cycles must pass before that non-sequential instruction has made its way along the instruction pipeline 16 to the central processing unit core 14. This period is utilised to output the address of the non-sequential instruction code fetch upon the trace bus. The multiple cycles available for this allow a time division multiplexing technique to be employed for different portions of the address thereby enabling the trace bus to be narrower. The same technique can be used to output data access addresses using time division multiplexing, but in this case a portion of the time taken to output the address overlaps with execution of some other instruction.

18 Claims, 3 Drawing Sheets

TRACE ANALYSIS OF DATA PROCESSING

BACKGROUND OF THE INVENTION

1. Field of the Invention

This invention relates to the field of data processing. More particularly, this invention relates to trace operations in data processing systems, such as are used during de-bugging of software and development of hardware.

2. Description of the Prior Art

An important function in providing trace operation is to provide trace data giving the address of the instruction currently being executed by the data processing system. If this trace information is to be provided in real time, then a dedicated bus is used to provide this trace address information to an external analysis system.

A problem with the above-mentioned approach arises due to the increasing bit lengths of addresses used within data processing systems, i.e. it is increasingly common to use 32-bit address, which would require a trace bus of at least 32-bits to carry the trace addresses in real time. It will be appreciated that the need to provide such large trace buses is a significant disadvantage. The number of external connection pins of an integrated circuit that would be required to carry out this trace bus would be a significant proportion of the total number of connection pins and results in an increase in the cost of the integrated circuit and/or limitations on the connection pins that may be provided for other purposes.

SUMMARY OF THE INVENTION

It is an object of the present invention to provide real time trace information without requiring a disadvantageously wide trace bus.

Viewed from one aspect, this invention provides apparatus for processing data, said apparatus comprising:

(i) a central processing unit core for executing instruction codes, each instruction code having an address within a memory, an address bus extending between said central processing unit core and said memory;

(ii) an instruction pipeline for feeding instruction codes to said central processing unit core, instruction codes being fetched from said memory to said instruction pipeline and then passed along said instruction pipeline to said central processing unit core for execution; and (iii) tracing means for generating trace data signals upon a trace bus, said tracing means comprising:

(a) trace address increment signal generating means for generating an trace address increment signal upon said trace bus when execution occurs of an instruction code having an address sequentially following an address of a preceding executed instruction code; and (b) trace address generating means for time division multiplexing onto said trace bus a plurality of portions of a trace address indicative of a fetched code address of an instruction code fetched to said pipeline when said fetched code address does not sequentially follow an address of a preceding fetched instruction code, said time division multiplexing occurring whilst said instruction code having said fetched code address moves along said instruction pipeline to reach said central processing unit core for execution.

The invention recognises that in a data processing system using an instruction pipeline, when a non-sequential instruction fetch is initiated (e.g. as a result of a branch or jump instruction being executed), there is a period of time during which the non-sequential instruction code makes its way along the pipeline before it is executed by the central processing unit core. This period of time may be utilised to time division multiplex portions of the non-sequential address onto the trace bus. Since the trace bus only need to carry a portion of the address at any one time, it may be narrower than otherwise would be possible.

Another feature of this system that enables a narrower trace bus to be used is the provision of a trace address increment signal. Such a signal, which may be a single bit, is all that is required to be output in the majority of instruction cycles in which sequential instructions are executed. The apparatus which is analysing the trace data stores a record of the currently executing address and merely increments this address in response to the trace address increment signal to provide a real time indication of the instruction currently being executed.

Whilst it will be appreciated that when the non-sequential instruction is first loaded into the instruction pipeline, the external apparatus will not yet have received its address, by the time that the non-sequential instruction Peaches the end of the pipeline and is executed by the central processing unit cope, the time division multiplexing may have completed allowing the full address of the non-sequential instruction to be available to the system analysing the trace data at the time it is actually executed.

As previously mentioned, when an instruction is executed that results in a non-sequential fetch to the pipeline, there will be a number of instructions already loaded in the pipeline that sequentially follow the instruction that caused the non-sequential fetch, but no longer require execution. In order to deal with this situation, then when a non-sequential fetch to said pipeline occurs, a pipeline purging means purges pending instruction codes already fetched to said pipeline from said pipeline without execution.

It will be appreciated that the trace address output from the system need not be identical to the fetch code address of the non-sequential instruction, i.e. the trace address could be an encoded version of the fetch code address. However, in preferred embodiments it is simpler if said trace address is said fetched code address.

In an analogous manner, the variety of portions of the trace address may be drawn up in a number of ways. However, the hardware needed to implement the invention is simplified when said plurality of portions of said trace address are contiguous multibit segments of said fetched code address.

It is possible to further reduce the number of bit lines required for the trace bus if said trace address generating means multilevel bit encodes said plurality of portions of said trace address onto said trace bus.

The above-described system deals with the output of trace addresses representing the address location storing instructions codes to be executed. Another class of trace data that is highly useful is to know the addresses storing data accessed during the operation of the system under analysis. In order to deal with this requirement without an excessive increase in the trace bus width, preferred embodiments of the invention comprise (i) data access address increment signal generating means for generating a data access address increment signal upon said trace bus when a data access operation occurs to a data word having an address sequentially following a preceding accessed data word; and (ii) data access address generating means responsive to a data access operation to a data access address not sequentially following an address of a preceding data access operation for time division multiplexing a plurality of portions of a data address indicative of said data access address onto said trace bus.

The above arrangement for tracing data access addresses recognises that a significant fraction of data accesses are sequential and can be traced merely by use of a data access address increment signal, with the remainder of data access addresses being non-sequential and requiring another means of output.

As with the fetch code address and trace address, it is preferred that the data address is the same as the data access address, the data address portions are contiguous multi-bit segments of the data access address and that a further reduction in bit width may be achieved by multilevel bit encoding the data access address.

It will be appreciated that the time division multiplexing of the data address onto the trace bus will require more than one cycle. Accordingly, if the trace bus is to be driven at the same rate as the pest of the data processing system, then it is necessary that said data access address generating means time division multiplexes said plurality of portions of said data address onto said trace bus during an overrun period extending beyond execution of said instruction code involving a data access operation.

In view of the overrun of the output of the data address following the execution of the instruction that caused that data access, there is potentially a problem where a non-sequential data access is followed by non-sequential instruction code fetch. In order to deal with this, preferred embodiments of the invention are such that said trace address generating means starts time division multiplexing said plurality of portions of said trace address onto said trace bus after a starting delay during which execution of an instruction code that initiated fetching of said instruction code from said fetched code address is completed such that said overrun period may be accommodated within said starting delay.

In order to deal with the plurality of different types and portions that may be output upon the trace bus at any given time, preferred embodiments of the invention comprise means for generating portion identifying signals upon said trace bus, said portion identifying signals being indicative of which of said plurality of portions of said trace address or said plurality of portions of said data address is present upon said trace bus.

A preferred implementation that enables time division multiplexing is one in which said trace address generating means comprises fetched code address capturing means for capturing and storing said fetched code address from said address bus and a multiplexer for successively selecting different portions of said fetched code address from said fetched code address capturing means as said plurality of portions of said trace address.

In order to cope with the interleaving of instruction fetches and data access requests utilising a common address bus to the memory, preferred embodiments of the invention comprise inference logic for receiving a plurality of status flags from said central processing unit core and inferring whether sequential fetches of instruction codes are being made independently of monitoring said address bus.

Such inference logic operating independently of the address bus is able to infer sequential instruction fetches even when these are intermixed with data accesses in a manner in which the actual addresses appearing on the address bus are non-sequential.

A complementary aspect of the present invention provides apparatus for receiving trace data from a trace bus, said apparatus comprising:

(i) a shadow program counter register for storing a shadow instruction code address of an instruction code being currently executed by said central processing unit core;

(ii) an incrementer for incrementing said shadow instruction code address in response to a trace address increment signal received from said trace bus; and (iii) means for time division demultiplexing a plurality of portions of a trace address received from said trace bus to derive a new shadow instruction code address to be loaded into said shadow program counter register.

This trace data receiver is able to respond to the time division multiplexed trace addresses and reassembled them into the fetch code addresses as well as being responsive to the trace address increment signal when sequential instruction codes are executed.

A preferred embodiment of this trace data receiver that is also able to deal with data access address tracing comprises a shadow data access address register for storing a shadow data access address of latest data word to be accessed by said central processing unit core;

an incrementer for incrementing said shadow data access address in response to a data access address increment signal received from said trace bus; and means for time division demultiplexing a plurality of portions of a data address received from said trace bus to derive a new shadow data access address to be loaded into said shadow data access address register.

Viewed from another aspect the invention provides a method of processing data, said method comprising the steps of:

(i) fetching instruction codes from a memory to an instruction pipeline and then passing said instruction codes along said instruction pipeline to a central processing unit core for execution, each instruction code having an address within said memory;

(ii) generating an trace address increment signal upon a trace bus when execution occurs of an instruction code having an address sequentially following an address of a preceding executed instruction code; and (iii) time division multiplexing onto said trace bus a plurality of portions of a trace address indicative of a fetched code address of an instruction code fetched to said pipeline when said fetched code address does not sequentially follow an address of a preceding fetched instruction code, said time division multiplexing occurring whilst said instruction code having said fetched code address moves along said instruction pipeline to reach said central processing unit core for execution.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
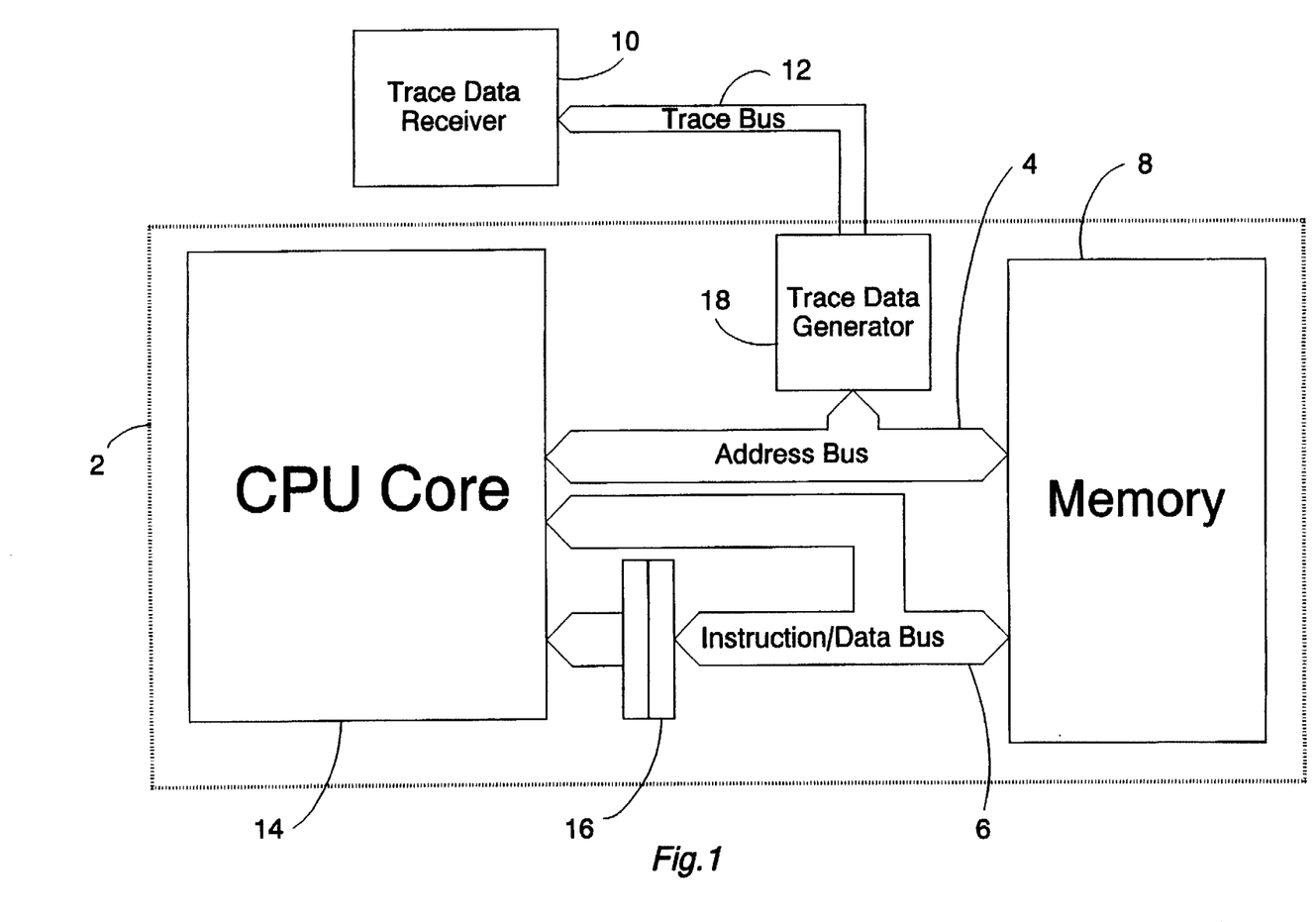
FIG. 1 schematically illustrates a data processing system incorporating a tracing facility.

FIG. 1 shows a central processing unit integrated circuit 2 having an address bus 4 and an instruction/data bus 6 to an on-chip memory 8. The central processing unit integrated circuit 2 is linked to a trace data receiver 10 via a trace bus 12.

Within the central processing unit integrated circuit 2 there is a central processing unit core 14, which executes instruction codes fed to it via an instruction pipeline 16. Instruction codes are fetched from the memory 8 on the instruction/data bus 6 and stored within a fetch stage of the instruction pipeline 16. From the fetch stage, an instruction code is passed to a decode stage and then to the central processing unit core 14 for execution.

Data words retrieved from or stored to the memory 8 by the central processing unit core 14 also pass via the instruction/data bus 6, but in this case by-pass the instruction pipeline 16 and enter the central processing unit core 14 via a different path.

An address bus 4 extends between the central processing unit core 14 and the memory 8. The central processing unit core 14 asserts an address upon the address bus 4 to indicate to the memory 8 which memory location within the memory 8 is to be accessed and have its value returned or written via the instruction/data bus 6.

The central processing unit integrated circuit 2 also includes a trace data generator 18. The trace data generator 18 receives the signals from the address bus 4 and outputs signals to the trace data receiver 10 via the trace bus 12. The trace bus 12 requires external pins upon the package of the central processing unit integrated circuit 2 in order to communicate with items external of the central processing unit integrated circuit 2. With the tend toward the use of wide address and data buses (e.g. 32-bit architectures and 64-bit architectures), there is an increasing pressure upon the number of external pins that are available. Accordingly, providing a full width trace bus to output addresses is a considerable overhead.

Figure 2:
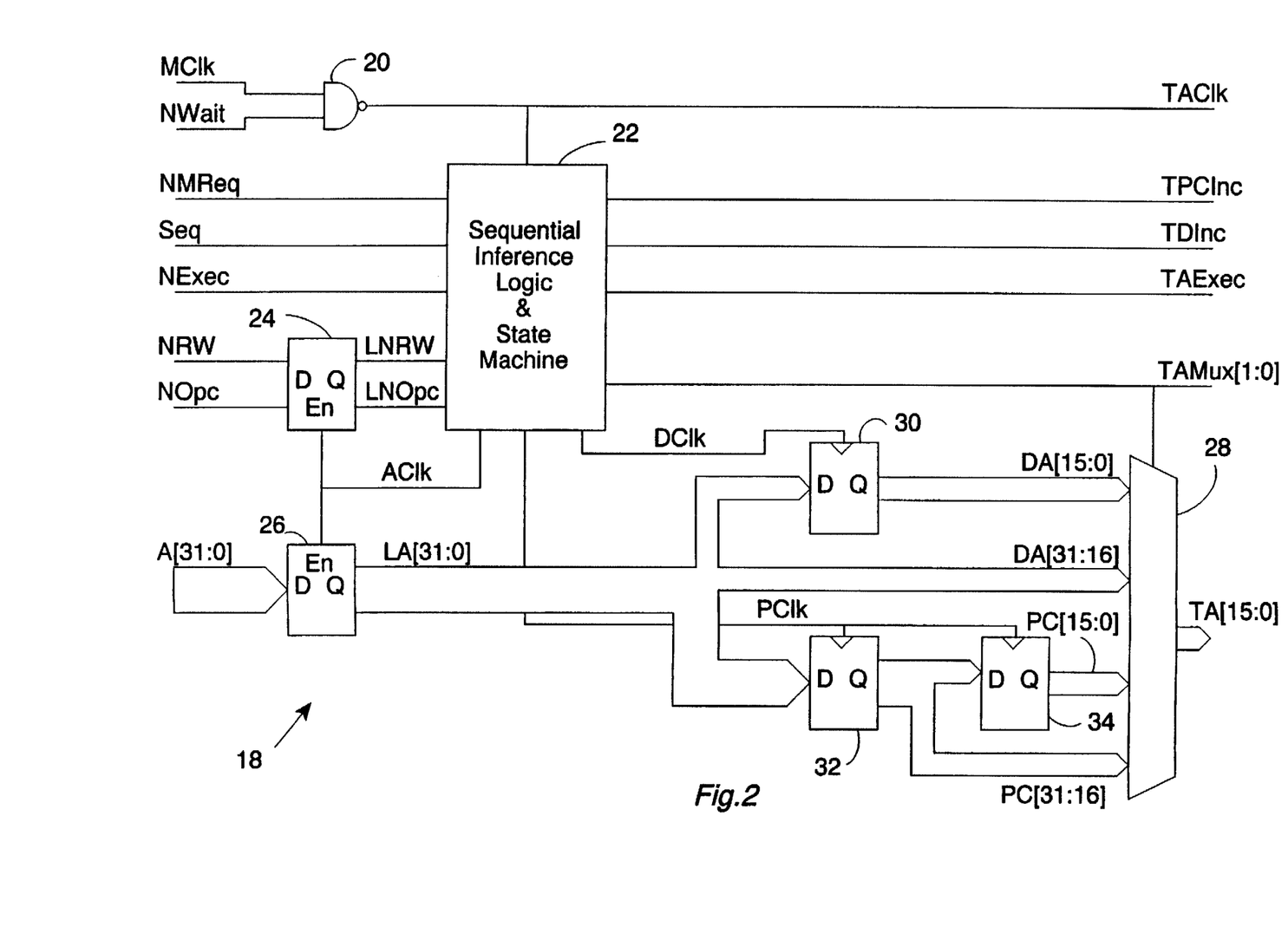
FIG. 2 illustrates a trace data generator.

FIG. 2 illustrates the trace data generator 18 in more detail. The trace data generator 18 receives thirty nine input signals at its lefthand side in FIG. 2. The trace data generator 18 generates twenty two output signals at its righthand side in FIG. 2.

A slow off-chip clock signal MClk is input with a signal indicating whether the system is in a wait state NWait to a NAND gate 20 to yield a trace clock signal TAClk.

A sequential inference logic and state machine block 22 receives a number of status signals from the central processing unit cope 14. These include a not memory request signal NMReq, a sequential memory access signal Seq, a not execute signal NExec, a not read or write signal NRW and a not opcode signal NOpc. The not read or write signal NRW and the note opcode NOpc are latched by a first latch 24. A description of the nature of the above-mentioned status signals may be found in the data sheet of the ARM6 microprocessor produced by Advanced RISC Machines Limited.

The logic block 22 combines these status flags to produce a plurality of output signals. A trace address increment signal TPCInc indicates whether the instruction pipeline 16 has been advanced to pass an instruction code to the central processing unit core 14 for execution that as an address sequentially following the previous instruction code fed to the central processing unit core 14. A data access address increment signal TDInc indicates that a data access (either a read or a write access) is being made to the memory 8 at an address sequentially following the previous data access to the memory 8. A trace execute signal TAExec indicates whether an instruction code being passed to the central processing unit core is not executed (e.g. as a result of conditional execution flags). Finally, a trace bus multiplexing signal TAMux[1:0] indicates which portion of an address of an instruction code or a data access word is being output upon the trace bus 12 when this occurs.

The address bus 4 is a 32-bit bus carrying 32-bit addresses. These addresses are split into 16-bit portions that are time division multiplexed onto the trace bus 12 under control of the trace data generator 18. A 32-bit address A[31:0] is received and latched within a second latch 26. If the address is a data access address, then its high order portion DA[31:16] is selected for output upon the trace bus 12 by a multiplexer 28 that is switched by the TAMux[1:0] signal. The least significant portion of such a data access address is meanwhile stored within a first register 30 from where it is selected for output as DA[15:0] via the multiplexer 28 upon the next cycle.

In the case of the address A[31:0] being an instruction code address of a non-sequential fetched instruction, the full address is stored within a second register 32. The uppermost portion of the address PC[31:16] is output via the multiplexer 28 upon the following cycle, with the lowermost portion PC[15:0] being output upon the next cycle, having been stored within a third register 34. The functions of the second register 32 and the third register 34 serve to mirror the action of the stages of the instruction pipeline 16, i.e. the uppermost portion of the non-sequentially fetched instruction code address is output when that instruction code is at the decode stage within the instruction pipeline 16 with its lowermost portion being output when the instruction code is being executed within the central processing unit core 14.

The action of the trace data generator 18 is such that when sequential instruction code fetches are made, the trace address increment signal is asserted with no need to output the full instruction code address. However, when a non-sequential instruction code fetch is made, the full address is time division multiplexed out of the trace data generator 18 via the trace bus 12 using the multiplexer 28, the second latch 26, the second register 32 and the third register 34.

In an analogous manner, when sequential data accesses are made, only the data access address increment signal TDInc need be asserted. When non-sequential data accesses are made, the full data access address is output via the multiplexer 28 using the second latch 26 and the first register 30.

Figure 3:
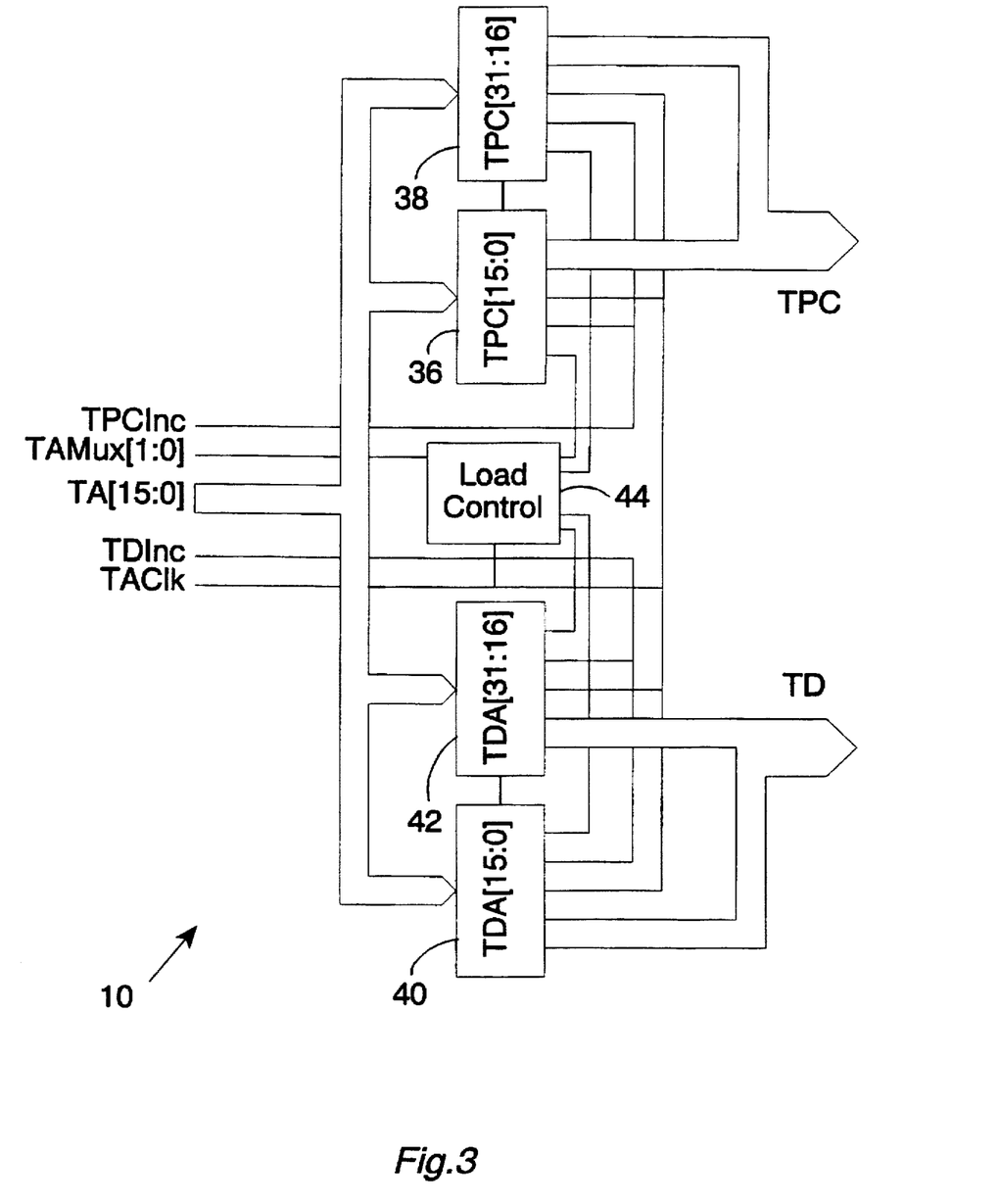
FIG. 3 illustrates a trace data receiver.

FIG. 3 illustrates the trace data receiver 10 in more detail. The trace data receiver 10 receives the trace bus 12 and functions to demultiplex the addresses passed to it and then store and increment these addresses as necessary. The trace data receiver 10 includes two counters 36, 38 that respectively store the low and high order portions of the address of the currently executing instruction code. Two further counters 40, 42 respectively store the low and high order portions of the latest address to which a data access was made.

If a sequential instruction code fetch is made, then this is indicated by the TPCInc signal that causes the counters 36, 38 to increment their currently stored value by four or some other value. (A single instruction code currently occupies four bytes within the memory 8.) In a similar way, if a sequential data access is made, the address stored within the counters 40, 42 is incremented by four.

In the case where non-sequential instruction code fetches or data accesses occur, the full addresses are time division multiplexed out of the trace data generator 18 onto the trace bus 12. The 16-bit portions of the address are received upon signal lines TA[1:0] and passed in parallel to each of the counters 36, 38, 40, 42. A load controller 44 is responsive to the TAMux[1:0] to render the appropriate one of the counters 36, 38, 40, 42 in a state which stores the portion of a full address currently being output on TA[15:0].

The full 32-bit addresses TPC and TDA may be read from a respective pair of the counters 36, 38, 40, 42 by further trace analysis hardware whenever required.

and the instruction codes pending within the instruction pipeline 16 are marked as not to be executed using their conditional execution flags (indicated by the "*"). Duping

TABLE 1

| Fetch Stage | Decode Stage | Execute Stage | PC Value | I/D Bus | Add Bus | Trace Bus | TPC | TDA |
|---|---|---|---|---|---|---|---|---|
| Branch (&N) | Seq2 (&N − 4) | Seq1 (&N − 8) | &N | Branch | &N | TPCInc | &N − 8 | — |
| Seq3 (&N + 4) | Branch (&N) | Seq2 (&N − 4) | &N + 4 | Seq3 | &N + 4 | TPCInc | &N − 4 | — |
| Seq4 (&N + 8) | Seq3 (&N + 4) | Branch (&N) | &N + 8 | Seq4 | &N + 8 | TPCInc | &N | — |
| NonSeq (&X) | *Seq4 (&N + 8) | *Seq3 (&N + 4) | &X | NonSeq | &X | — | — | — |
| Seq5 (&X + 4) | NonSeq (&X) | *Seq4 (&N + 8) | &X + 4 | Seq5 | &X + 4 | X[31:16] | XH | — |
| Seq6 (&X + 8) | Seq5 (&X + 4) | NonSeq (&X) | &X + 8 | Seq6 | &X + 8 | X[15:0] | &X | — |
| Seq7 (&X + 12) | Seq6 (&X + 8) | Seq5 (&X + 4) | &X + 12 | Seq7 | &X + 12 | TPCInc | &X + 4 | — |

Table 1 illustrates the operation of the tracing system when a branch instruction is executed that results in a non-sequential instruction fetch. The program counter value PC indicates the address within the memory 8 from which an instruction, if any, is to be fetched in the current cycle. In the case illustrated, a Branch instruction from address &N ("&" indicates the following variable is an address value) is fetched during the first cycle. At this time, the instruction code currently being executed by the central processing unit core 14 is a sequential instruction code Seq1 from address &N-8. The Branch instruction is fetched from the memory over the instruction/data bus 6 in response to address &N being asserted upon the address bus 4.

The Branch instruction progresses along the instruction pipeline 16 until it Peaches the execute stage with each advance of the instruction pipeline 16 between sequential addresses being accompanied by generation of a TPCInc signal that triggers incpementing of the trace address TPC within the trace data receiver 10. The trace data receiver 10 holds the address of the instruction code being currently executed by the centpal processing unit cope 14.

When the Branch instruction is executed, a non-sequential instruction code fetch from a fetch address &X is made. At this time, the TPCInc signal is still asserted since a sequential increment was made from the previous cycle, but is not asserted in the following cycle since a non-sequential jump has occurred. The non-sequential instruction NonSeq from address &X is loaded into the fetch stage upon the next cycle the execution of the Branch instruction itself, a sequential instruction code fetch occurs bringing instruction Seq4 into the instruction pipeline 16 since the condition codes of the Branch instruction itself have not yet been evaluated and it may be that the Branch instruction would not be carried out.

In the second cycle following execution of the Branch instruction, the most significant sixteen bits of the address of the non-sequential instruction X[31:16] are output via the trace bus 12 and a sequential instruction fetch of Seq5 is made from the location following that of the non-sequential instruction NonSeq. In the next cycle the lowermost sixteen bits X[15:0] are output and the non-sequential instruction NonSeq peaches the execution stage of the pipeline. By the time this has occurred, the full address &X of this non-sequential instruction NonSeq has been time division multiplexed out of the central processing unit integrated circuit 2 and is available for trace purposes in peal time. Execution of the sequential instruction Seq5 is accompanied by assertion of the TPCInc signal that increments the trace program counter value within the trace data receiver 10.

It will be seen that the operation illustrated in Table 1 utilises the time taken fop the Branch instruction to propagate along the instruction pipeline 16 to time division multiplex the full address of the Branch instruction onto the trace bus 12.

TABLE 2

| Fetch Stage | Decode Stage | Execute Stage | PC Value | I/D Bus | Add Bus | Trace Bus | TPC | TDA |
|---|---|---|---|---|---|---|---|---|
| STR(&Z) (&N) | Seq2 (&N − 4) | Seq1 (&N − 8) | &N | STR(&Z) | &N | TPCInc | &N − 8 | — |
| Seq3 (&N + 4) | STR(&Z) (&N) | Seq2 (&N − 4) | &N + 4 | Seq3 | &N + 4 | TPCInc | &N − 4 | — |
| Seq4 (&N + 8) | Seq3 (&N + 4) | STR(&Z) (&N) | &N + 8 | Seq4 | &N + 8 | TPCInc | &N | — |
| Seq4 (&N + 8) | *Seq3 (&N + 4) | STR(&Z) (&N) | &N + 12 | Data&Z | &Z | Z[31:16] | &N | ZH |
| Seq5 (&N + 12) | Seq4 (&N + 8) | Seq3 (&N + 4) | &N + 12 | Seq5 | &N + 12 | Z[15:0] TPCInc | &N + 4 | &Z |
| Seq6 (&N + 16) | Seq5 (&N + 12) | Seq4 (&N + 8) | &N + 16 | Seq6 | &N + 16 | TPCInc | &N + 8 | &Z |

Table 2 illustrates a non-sequential data access in the form of storing a single data word into a register. A sequence of sequential instructions Seq1, Seq2 are executed by the central processing unit core 14 until the non-sequential data access instruction STR reaches the execute stage. The STR instruction operates to store a register value within the central processing unit core to memory location &Z. In the first cycle of the execution of the STR instruction, a sequential instruction code fetch is made bringing in instruction Seq4 to the fetch stage via the instruction/data bus 6. In the following cycle, the address &Z is ready to be asserted upon the address bus 4 with the result that the contents of the register (specified by the instruction) are stored to address &Z via the instruction/data bus 6 as value Data&Z. During this cycle, the most significant portion of the address &Z is output via the trace bus 12 as signals Z[31:16].

In the next cycle, sequential instruction Seq3 is executed. During this cycle, the second portion of the address &Z is output as signals Z[15:0] on the trace bus 12. It will thus be seen that the output of this data access address on the trace bus 12 overlaps instruction cycles beyond those which triggered the data access.

within the memory 8. The operation progresses as in the manner illustrated in Table 2 up until the end of the second execution cycle of the STM instruction. In this case, the STM instruction is such that it causes four successive data words to be stored to the memory locations starting at address &Z and extending to address &Z+12. The data words are stored to the memory 8 on the instruction/data bus 6 upon successive cycles. During the first two of these cycles, the high portion and then the low portion of the address &Z together with a data access address increment signal TDInc are output by the trace bus 12. In the following two cycles, the data access address increment signal TDInc is asserted indicating that the data access address should be incremented (a full output of the address is not necessary). The value of the access address held within the trace data receiver lags one cycle behind that actually being effected by the central processing unit core 14 at that time. This lag of one cycle in the access address held by the trace data

TABLE 3

| Fetch Stage | Decode Stage | Execute Stage | PC Value | I/D Bus | Add Bus | Trace Bus | TPC | TDA |
|---|---|---|---|---|---|---|---|---|
| STM(&Z) (&N) | Seq2 (&N − 4) | Seq1 (&N − 8) | &N | STM(&Z) (&N) | &N | TPCInc | &N − 8 | — |
| Seq3 (&N + 4) | STM(&Z) (&N) | Seq2 (&N − 4) | &N + 4 | Seq3 | &N + 4 | TPCInc | &N − 4 | — |
| Seq4 (&N + 8) | Seq3 (&N + 4) | STM(&Z) (&N) | &N + 8 | Seq4 | &N + 8 | TPCInc | &N | — |
| Seq4 (&N + 8) | Seq3 (&N + 4) | STM(&Z) (&N) | &N + 12 | Data&Z | &Z | Z[31:16] | &N | ZH |
| Seq4 (&N + 8) | Seq3 (&N + 4) | STM(&Z) (&N) | &N + 12 | Data&Z + 4 | &Z + 4 | Z[15:0] TDInc | &N | &Z |
| Seq4 (&N + 8) | Seq3 (&N + 4) | STM(&Z) (&N) | &N + 12 | Data&Z + 8 | &Z + 8 | TDInc | &N | &Z + 4 |
| Seq4 (&N + 8) | Seq3 (&N + 4) | STM(&Z) (&N) | &N + 12 | Data &Z + 12 | &Z + 12 | TDInc | &N | &Z + 8 |
| Seq5 (&N + 12) | Seq4 (&N + 8) | Seq3 (&N + 4) | &N + 12 | Seq5 | &N + 12 | TPCInc | &N + 4 | &Z + 12 |
| Seq6 (&N + 16) | Seq5 (&N + 12) | Seq4 (&N + 8) | &N + 16 | Seq6 | &N + 16 | TPCInc | &N + 8 | &Z + 12 |

Table 3 illustrates execution of an instruction STM that results in multiple data accesses to sequential addresses receiver 10 is also present when a single access is made as in the case illustrated in Table 2.

TABLE 4

| Fetch Stage | Decode Stage | Execute Stage | PC Value | I/D Bus | Add Bus | Trace Bus | TPC | TDA |
|---|---|---|---|---|---|---|---|---|
| STR(&Z) (&N) | Seq2 (&N − 4) | Seq1 (&N − 8) | &N | STR(&Z) | &N | TPCInc | &N − 8 | — |
| Branch (&N + 4) | STR(&Z) (&N) | Seq2 (&N − 4) | &N + 4 | Branch | &N + 4 | TPCInc | &N − 4 | — |
| Seq3 (&N + 8) | Branch (&N + 4) | STR(&Z) (&N) | &N + 8 | Seq3 | &N + 8 | TPCInc | &N | — |
| Seq3 (&N + 8) | Branch (&N + 4) | STR(&Z) (&N) | &N + 8 | Data&Z | &Z | Z[31:16] | &N | ZH |
| Seq4 (&N + 12) | Seq3 (&N + 8) | Branch (&N + 4) | &N + 12 | Seq4 | &N + 12 | Z[15:0] TPCInc | &N + 4 | &Z |
| NonSeq (&X) | *Seq4 (&N + 12) | *Seq3 (&N + 8) | &X | NonSeq | &X | — | | &Z |
| Seq5 (&X + 4) | NonSeq (&X) | *Seq4 (&N + 12) | &X + 4 | Seq5 | &X + 4 | X[31:16] | XH | &Z |
| Seq6 (&X + 8) | Seq5 (&X + 4) | NonSeq (&X) | &X + 8 | Seq6 | &X + 8 | X[15:0] | &X | &Z |
| Seq7 (&X + 12) | Seq6 (&X + 8) | Seq5 (&X + 4) | &X + 12 | Seq7 | &X + 12 | TPCInc | &X + 4 | &Z |

Table 4 illustrates a non-sequential data access immediately followed by a non-sequential instruction code fetch. In this case, the STR instruction progresses along the pipeline in the same manner illustrated in Table 2. The STR instruction is immediately followed in the pipeline by a non-sequential Branch instruction. When the Branch instruction reaches the execution stage, the least significant portion of the data access address Z[15:0] is still being output upon the trace bus 12. However, since the output of the most significant portion of the instruction code fetch address X[13:16] does not start until a later cycle (as illustrated in Table 1), this overlap does not matter. Following execution of the Branch instruction, the non-sequential instruction NonSeq is executed once it has been fetched and made its way down the pipeline to the execute stage. The intervening instructions are marked to not be executed using their conditional execution flags in a manner that effectively purges them from the instruction pipeline after two pipeline cycles.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus fop processing data, said apparatus comprising:
   (i) a central processing unit cope fop executing instruction codes, each instruction code having an address within a memory, an address bus extending between said central processing unit cope and said memory;
   (ii) an instruction pipeline for feeding instruction codes to said central processing unit cope, instruction codes being fetched from said memory to said instruction pipeline and then passed along said instruction pipeline to said central processing unit core fop execution; and
   (iii) tracing means fop generating trace data signals upon a trace bus, said tracing means comprising:
      (a) trace address increment signal generating means for generating an trace address increment signal upon said trace bus when execution occurs of an instruction code having an address sequentially following an address of a preceding executed instruction code; and
      (b) trace address generating means fop time division multiplexing onto said trace bus a plurality of portions of a trace address indicative of a fetched code address of an instruction code fetched to said pipeline when said fetched code address does not sequentially follow an address of a preceding fetched instruction code, said time division multiplexing occurring whilst said instruction code having said fetched code address moves along said instruction pipeline to reach said central processing unit cope for execution.

2. Apparatus as claimed in claim 1, comprising:
   (i) data access address increment signal generating means for generating a data access address increment signal upon said trace bus when a data access operation occurs to a data word having an address sequentially following a preceding accessed data word; and
   (ii) data access address generating means responsive to a data access operation to a data access address not sequentially following an address of a preceding data access operation for time division multiplexing a plurality of portions of a data address indicative of said data access address onto said trace bus.

3. Apparatus as claimed in claim 2, wherein said data address is said data access address.

4. Apparatus as claimed in claim 3, wherein said plurality of portions of said data address are contiguous multibit segments of said data access address.

5. Apparatus as claimed in claim 2, wherein said data access address generating means time division multiplexes said plurality of portions of said data address onto said trace bus during an overrun period extending beyond execution of said instruction code involving a data access operation.

6. Apparatus as claimed in claim 5, wherein said trace address generating means starts time division multiplexing said plurality of portions of said trace address onto said trace bus after a starting delay during which execution of an instruction code that initiated fetching of said instruction code from said fetched code address is completed such that said overrun period may be accommodated within said starting delay.

7. Apparatus as claimed in claim 2, wherein said data access address generating means multilevel bit encodes said plurality of portions of said data address onto said trace bus.

8. Apparatus as claimed in claim 2, comprising means for generating portion identifying signals upon said trace bus, said portion identifying signals being indicative of which of said plurality of portions of said trace address or said plurality of portions of said data address is present upon said trace bus.

9. Apparatus as claimed in claim 2, comprising inference logic for receiving a plurality of status flags from said central processing unit core and inferring whether sequential fetches of instruction codes are being made independently of monitoring said address bus and wherein data access addresses are interleaved with instruction code addresses.

10. Apparatus as claimed in claim 1, wherein said trace address is said fetched code address.

11. Apparatus as claimed in claim 10, wherein said plurality of portions of said trace address are contiguous multibit segments of said fetched code address.

12. Apparatus as claimed in claim 1, wherein, when a non-sequential fetch to said pipeline occurs, a pipeline purging means purges pending instruction codes already fetched to said pipeline from said pipeline without execution.

13. Apparatus as claimed in claim 1, wherein said trace address generating means comprises fetched code address capturing means for capturing and storing said fetched code address from said address bus and a multiplexer for successively selecting different portions of said fetched code address from said fetched code address capturing means as said plurality of portions of said trace address.

14. Apparatus as claimed in claim 1, comprising inference logic for receiving a plurality of status flags from said central processing unit core and inferring whether sequential fetches of instruction codes are being made independently of monitoring said address bus.

15. Apparatus as claimed in claim 1, wherein said trace address generating means multilevel bit encodes said plurality of portions of said trace address onto said trace bus.

16. Apparatus for receiving trace data from a trace bus, said apparatus comprising:
   (i) a shadow program counter register for storing a shadow instruction code address of an instruction code being currently executed by said central processing unit core;
   (ii) an incrementer for incrementing said shadow instruction code address in response to a trace address increment signal received from said trace bus; and (iii) means for time division demultiplexing a plurality of portions of a trace address received from said trace bus to derive a new shadow instruction code address to be loaded into said shadow program counter register.

17. Apparatus as claimed in claim 16, comprising:

a shadow data access address register for storing a shadow data access address of latest data word to be accessed by said central processing unit core;

an incrementer for incrementing said shadow data access address in response to a data access address increment signal received from said trace bus; and means for time division demultiplexing a plurality of portions of a data address received from said trace bus to derive a new shadow data access address to be loaded into said shadow data access address register.

18. A method of processing data, said method comprising the steps of:

(i) fetching instruction codes from a memory to an instruction pipeline and then passing said instruction codes along said instruction pipeline to a central processing unit core for execution, each instruction code having an address within said memory;

(ii) generating an trace address increment signal upon a trace bus when execution occurs of an instruction code having an address sequentially following an address of a preceding executed instruction code; and (iii) time division multiplexing onto said trace bus a plurality of portions of a trace address indicative of a fetched code address of an instruction code fetched to said pipeline when said fetched code address does not sequentially follow an address of a preceding fetched instruction code, said time division multiplexing occurring whilst said instruction code having said fetched code address moves along said instruction pipeline to reach said central processing unit core for execution.

* * * * *

UNITED STATES PATENT AND TRADEMARK OFFICE
CERTIFICATE OF CORRECTION

PATENT NO.  : 5,642,479

DATED       : June 24, 1997

INVENTOR(S): David W. Flynn

It is certified that error appears in the above-identified patent and that said Letters Patent is hereby corrected as shown below:

Column 11, lines 27, 29, 37, 38 and 46, delete "fop", and insert --for--;

Column 11, lines 29, 32 and 34, delete "cope", and insert --core--.

Signed and Sealed this

Second Day of September, 1997

Attest:

BRUCE LEHMAN

Attesting Officer

Commissioner of Patents and Trademarks